United States Patent [19]

Meyer

[11] Patent Number: 5,269,618
[45] Date of Patent: Dec. 14, 1993

[54] INDEXABLE INSERT DRILL

[76] Inventor: Mark D. Meyer, R.R. #6, Boundary Rd., Box 93A, Wapakoneta, Ohio 45895

[21] Appl. No.: 974,964

[22] Filed: Nov. 12, 1992

[51] Int. Cl.$^5$ ............................................. B23B 51/02
[52] U.S. Cl. .................................. 408/188; 408/189; 408/224; 408/713
[58] Field of Search ............... 408/187, 188, 189, 223, 408/224, 225, 713, 227, 229, 230, 200

[56] References Cited

U.S. PATENT DOCUMENTS

| | | | |
|---|---|---|---|
| 3,963,365 | 6/1976 | Shallenberger, Jr. | 408/186 |
| 4,124,328 | 11/1978 | Hopkins | 408/223 |
| 4,230,429 | 10/1980 | Eckle | 408/186 |
| 4,293,252 | 10/1981 | Kress et al. | 408/224 |
| 4,303,358 | 12/1981 | Grusa | 408/223 |
| 4,505,626 | 3/1985 | Benhase | 408/224 |
| 4,531,867 | 7/1985 | Benhase | 408/224 |
| 4,563,113 | 1/1986 | Ebenhoch | 408/223 |
| 4,586,858 | 5/1986 | Kubota | 408/224 |
| 4,889,455 | 12/1989 | Karlsson et al. | 408/188 |
| 4,889,456 | 12/1989 | Killinger | 408/224 |
| 5,049,011 | 9/1991 | Bohnet et al. | 408/223 |

FOREIGN PATENT DOCUMENTS

| | | | |
|---|---|---|---|
| 432340 | 6/1991 | European Pat. Off. | 408/223 |
| 2746232 | 4/1979 | Fed. Rep. of Germany | 408/223 |
| 279410 | 12/1986 | Japan | 408/223 |

*Primary Examiner*—Daniel W. Howell
*Attorney, Agent, or Firm*—Ralph L. Marzocco

[57] ABSTRACT

An indexable insert drill for producing a hole in a workpiece by relative rotary motion between the drill and workpiece. The drill comprises an elongated body having a central axis and a leading end, and a plurality of cutting inserts mounted on the leading end of the body. The cutting inserts are displaced at different radial locations relative to the central axis of the body. Each cutting insert has a cutting edge formed by a pair of respective inside and outside active cutting edge segments with the inside cutting edge segment being located closer to the central axis of the body than the outside cutting edge segment thereof. The inside and outside cutting edge segments of the respective cutting inserts extend at obtuse angles to one another and define therebetween apexes which are axially displaced at different distances from a plane normal to the central axis of the drill at the leading end of the drill which distances increase in length from an innermost one of the inserts to an outermost one thereof.

13 Claims, 2 Drawing Sheets

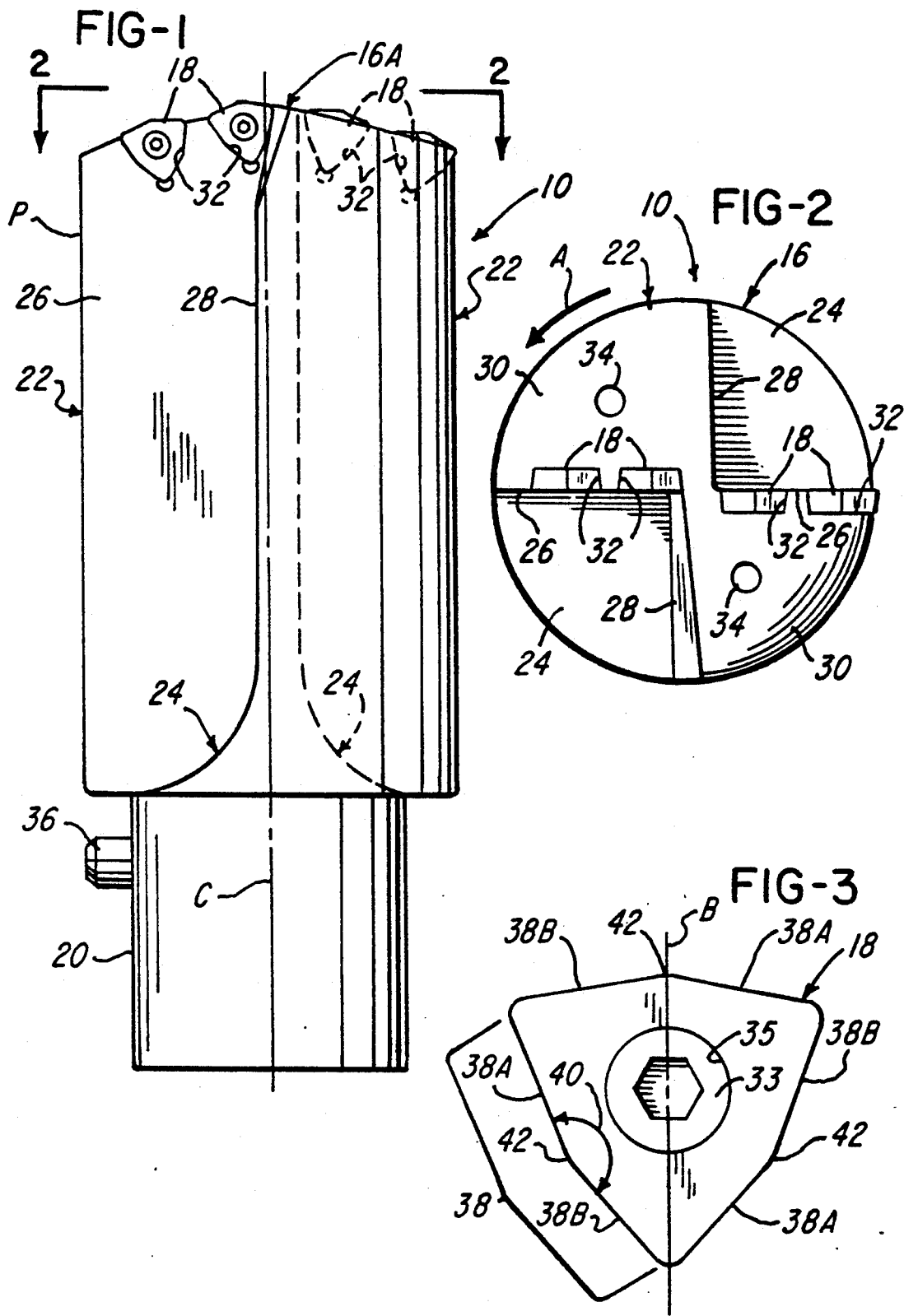

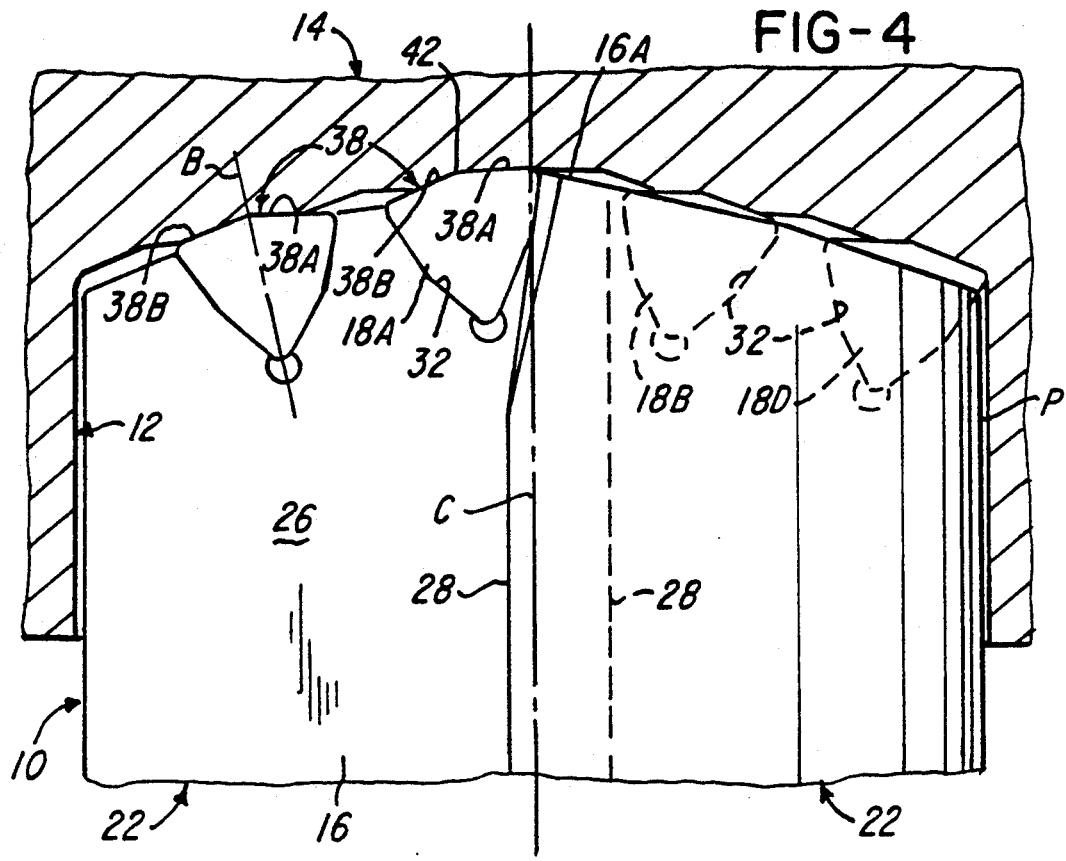
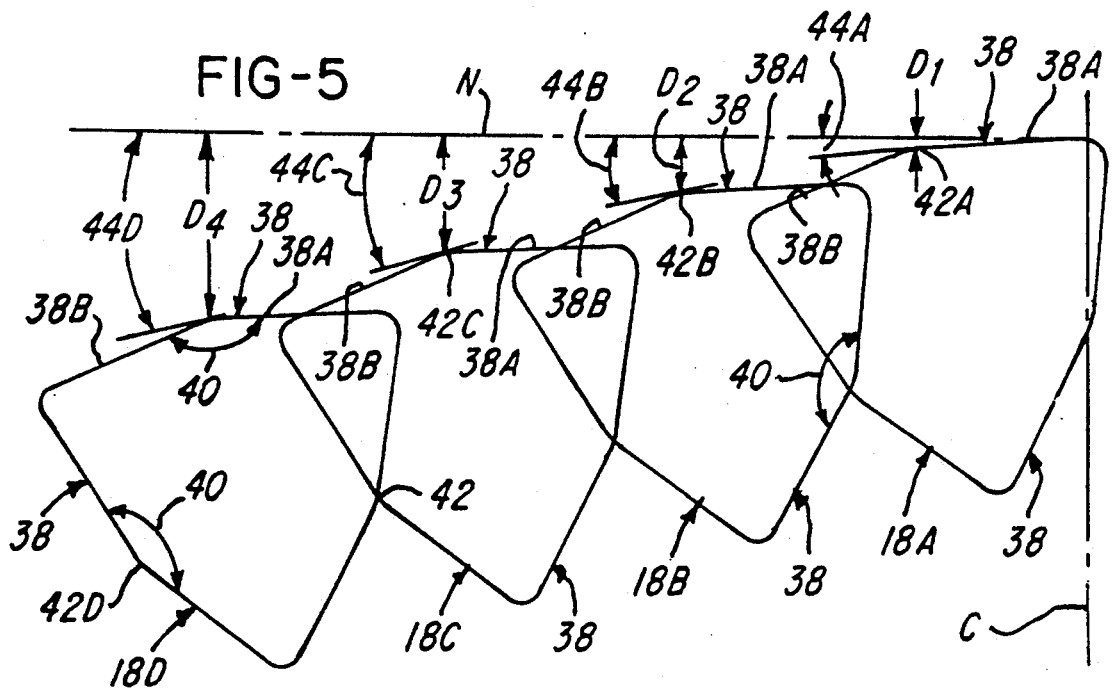

INDEXABLE INSERT DRILL

BACKGROUND OF THE INVENTION

1. Field of the Invention

The present invention generally relates to an indexable insert drill and, more particularly, is concerned with an indexable drill for producing a hole in a single metal workpiece or a stack of metal workpieces.

2. Description of the Prior Art

Indexable drills are known in the prior patent art. They utilize indexable and replaceable cutting inserts capable of higher surface speeds than conventional steel twist drill. Also, they eliminate the costly grinding to sharpen the cutting end and removal of the tool from the drill. Even though indexable drills have proven to create holes faster and more economically than conventional drills, they still have certain shortcomings which limit their applications. Conventional drills are still widely used throughout the industry in many applications.

One shortcoming of current indexable drills is that they require more rigidity in the part setup and machine spindle than conventional twist drills. Indexable drill geometry is usually of a more unbalanced cutting condition at the point of part entry and during the drill cycle than a conventional center cutting drill which has two equal cutting flutes. Once started in a hole, a conventional drill can be used successfully at great length to diameter ratios. Indexable drill performance severely degenerates as the length to diameter ratios exceed three times diameter.

Another shortcoming of current indexable drills is that they generate a rough hole finish in most material. "Rough" is the term used to compare the surface finish achieved by drills in comparison to the surface finish that can be achieved in the same hole by boring after drilling. Depending on the functional application of the hole, often subsequent machining operations are performed to achieve size and finish after drilling. One common practice with an indexable drill is to "back-bore" after drilling by detenting the drill in the axis aligned with the outer insert and reverse feeding the drill back out of the hole. The much better surface finish obtained by this practice clearly demonstrates that the outside insert corner radius is subjected to much more movement in the drilling cycle than the boring cycle.

Still another shortcoming of current indexable drills is that they are considered to be of the rough hole drilling nature. Thus, some allowance is made for manufacturing tolerance in machining the insert pocket and insert size control. The end-user has responsibility to provide the best possible machining conditions. Much size control is lost due to drill "walking" during the cut.

Yet another shortcoming of current indexable drills is chip control. Chip control is very important to drill longevity. Many end users cannot use this type drill due to their inability to provide sufficient amounts of coolant from the machine source. The coolant's primary function is to flush out the chip from the flutes to prevent the re-cutting of chips and to prevent chips from wedging between the outside drill body and the hole inside surface. This condition causes galling of the drill and part surfaces and will destroy the drill.

And another shortcoming of current indexable drills is that the slug created by the drill geometry during cutting prohibits cutting stacked material. The slug will begin to spin with the drill at the parting line of the stacked material and cannot be cut out of the way. The rotating slug will then jam the cutting inserts and cause drill destruction.

A further shortcoming of current indexable drills is horsepower requirements. They require more horsepower from machine tools to cut than do the conventional steel twist drills.

Consequently, a need still exists for improvement of indexable drills so as to overcome these shortcomings without introducing new ones in their place.

SUMMARY OF THE INVENTION

The present invention provides an indexable insert drill designed to satisfy the aforementioned need. The drill of the present invention provides improvements which overcome the above-described shortcomings of current indexable drills.

One improvement of the drill is its sloped-back phasing of the inserts that more closely resembles a conventional drill than prior designs. This "sloping-back" creates more stability in the cut and requires less setup rigidity. As a result, longer length to diameter ratios are possible without the addition of any wearlands or other problematic additions to the drill.

Another improvement of the drill is the stability of its geometry in the cut which yields greatly improved surface finish equal to those produced by boring in the same material. Testing has shown that stability of the drill in cutting has a direct impact on surface finishes and could greatly improve cycle times by eliminating secondary operations. Still another improvement of the drill is that the excellent stability in the cut cycle means improved hole size control.

Yet another improvement of the drill is improved chip control. Each cutting insert in the drill geometry is disposed along an axis forming an angle of from 13° to 15° with a central axis of the drill 10. The force of cutting expels the chip towards the central axis of the drill and away from the inside diameter surface of the part. Resultant reduced coolant volume and pressure requirements could negate expensive machine modification. Also, the drill uses one size of cutting insert. As the drill diameter increases, additional cutting inserts are added in the same radial backward sloping pattern. As a result, the chip width is kept small for easier expulsion from the drill flutes.

Still another improvement of the drill is that it develops the cut from the center of the drill first, and therefore is applicable to both single thickness and stacked material.

A further improvement of the drill is that it requires less horsepower to operate than other indexable drills. This enables larger hole drilling capability of existing machinery. This can result in substantial savings by eliminating the need for more hole enlarging operations. The outside cutting edge segment of each cutting insert is sloped back from 23° to 25° relative to a plane extending normal to the central axis of the drill through the front tip of the drill, which creates a gentle shearing effect. This lead angle also serves to thin the chip.

Accordingly, the present invention is directed to an indexable drill for producing a hole in a workpiece by relative rotary motion between the drill and workpiece. The indexable drill comprises an elongated body having a central axis and a leading end, and a plurality of cutting inserts mounted on the leading end of the body.

More particularly, the cutting inserts are displaced at different radial locations relative to the central axis of the body. Each cutting insert has a cutting edge formed by a pair of respective inside and outside active cutting edge segments with the inside cutting edge segment being located closer to the central axis of the body than the outside cutting edge segment thereof. The inside and outside cutting edge segments of the respective cutting inserts extend at obtuse angles to one another and define therebetween apexes which are axially displaced at different distances from a plane normal to the central axis of the drill at the leading end of the drill which distances increase in length from an innermost one of the inserts to an outermost one thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of an indexable insert drill of the present invention.

FIG. 2 is a top plan view of the drill as seen along line 2—2 of FIG. 1.

FIG. 3 is an enlarged plan view of an indexable cutting insert of the drill of FIG. 1.

FIG. 4 is an enlarged schematic view showing the configuration of a hole being drilled in a workpiece by cutting inserts of the drill of the present invention.

FIG. 5 is an enlarged schematic layout view of the cutting inserts aligned at their respective different radial locations relative to the central axis of the drill.

DETAILED DESCRIPTION OF THE INVENTION

Referring to the drawings, and particularly to FIGS. 1 and 2, there is illustrated an indexable insert drill, generally designated 10, for producing a hole 12 in a metal workpiece 14 (FIG. 4) by relative rotary motion between the drill 10 and workpiece 14, the drill 10 being constructed in accordance with the principles of the present invention. The drill 10 basically includes an elongated generally cylindrical body 16 and a plurality of indexable cutting inserts 18 mounted on a leading end 16A of the drill body 16.

The cylindrical body 16 of the drill 10 has a shank 10 extending axially along a rear portion of the body 16 for mounting the drill 10 and a pair of diametrically opposed sectors 22 extending along a front portion of the body 16 adjacent to opposite sides of a central axis C thereof. Either the drill 10 is mounted at its shank 20 for rotation by a machine (not shown) while the workpiece 14 is maintained stationary, or vice versa, to produce the hole 12 in the workpiece 14 through cutting into the workpiece 14 by the inserts 18. The sectors 22 are spaced circumferentially from one another by intervening flutes 24 which open at the leading end 16A of the body 16 in a direction pointing away from the shank 20.

More particularly, each sector 22 has a pair of side wall surfaces 26, 28 angularly displaced circumferentially from one another by about ninety degrees and extending generally radially outwardly from the central axis C of the body 16 and an end wall surface 30 extending between and interconnecting the side wall surfaces 26, 28. The one side wall surface 26 leads and the other side wall surface 28 trails relative to the direction of rotation of the drill 10, being indicated by the arrow A in FIG. 2, during a cutting operation.

The drill 10 also includes one or more axially extending passages 34 defined through the sectors 22 of the body 16 and opening at the leading end 16A thereof. A flow of coolant liquid under pressure is discharged from the passages 34 at the leading end 16A of the drill 10 to cool the cutting inserts 18 and evacuate chips generated by the cutting operation. The coolant liquid enters the drill 10 via an appropriate fitting 36 on the shank 20 which is connected to a suitable source (not shown).

Also, each sector 22 contains one or more pockets 32 defined in the one side wall surface 26 thereof. The pockets 32 open to the leading end 16A of the drill body 16. Each pocket 32 seats one of the plurality of indexable cutting inserts 18 which are attached to the respective sector 22 by screws 33 received through apertures 35 in the center of inserts. The screws 33 can be loosened and removed to remove and rotatably index the cutting inserts 18.

Referring to FIGS. 4 and 5, the pockets 32 place the indexable cutting inserts 18A–18D at different radial locations relative to the central axis C of the drill 10. The cutting inserts 18A–18D are arranged in a sloped-back phasing. Each cutting insert in the drill geometry is disposed along an axis B which forms an angle from 13° to 15° with the central axis C of the drill 10. The innermost insert 18A overlaps slightly with the central axis C of the drill 10, while the outermost insert 18D overlaps slightly with the periphery P of the drill 10. Furthermore, the cutting inserts 18 are offset from one another but also overlap one another so that together the inserts 18A–18D form an overall continuous cutting edge from the central axis C of the drill 10 to the periphery P thereof.

Referring to FIGS. 3 and 4, more particularly, each cutting insert 18 has the shape of a generally equilateral triangle where each side of the triangle is formed by a cutting edge 38 having a pair of respective inside and outside active cutting edge segments 38A, 38B extending at an obtuse angle 40 relative to one another, such as between 155° and 160° and preferably at about 157.5° relative to one another. The outside cutting edge segment 38B of each cutting edge 38 of each cutting insert 18 is sloped back from 23° to 25° relative to a plane N extending normal to the central axis C of the drill through the front tip of the drill 10.

Referring to FIG. 4, the inside and outside cutting edge segments 38A, 38B define therebetween an apex 42 at their intersection with one another. The apexes 42 are axially displaced at different distances $D_1$–$D_4$ from the plane N normal to the central axis C of the drill body 16 at the leading end 16A thereof. The different distances increase in length from the innermost cutting insert 18A to the outermost insert 18D. Each apex 42 is also angularly displaced at an acute angle 44 from the normal plane N to the central axis C of the drill 10. The acute angles 44A–44D between the respective apexes 42A–42D of the inserts 18A–18D increase in size going from the innermost insert 18A to the outermost insert 18D. For example, the apex 42A of the innermost insert 18A forms an acute angle 44A of about 3° with the normal plane N; the apex 42B of the next innermost insert 18B forms an acute angle 44B of about 7° with the normal plane N; the apex 42C of the next outermost insert 18C forms an acute angle 44C of about 10° with the normal plane N; and the apex 42D of the outermost insert 18D forms an acute angle 44D of about 11° with the normal plane N.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A drill for producing a hole in a workpiece by relative rotary motion between the drill and workpiece and by movement of the drill relative to the workpiece in a forward cutting direction, said drill comprising:
   (a) an elongated body having a central axis and a leading end; and
   (b) a plurality of cutting inserts mounted on said leading end of said body, said cutting inserts being displaced at different radial locations relative to said central axis of said body, each said cutting insert having a cutting edge formed by a pair of respective inside and outside active cutting edge segments with said inside cutting edge segment being located closer to said central axis of said body than said outside cutting edge segment thereof, said inside and outside cutting edge segments of said respective cutting inserts extending at obtuse angles to one another and defining therebetween apexes which are axially displaced at different distances from a plane normal to said central axis of said body at said leading end thereof, said different distances increasing in length from an innermost one of the inserts to an outermost one thereof, said innermost one of said cutting insert overlapping slightly with said central axis of said body and said outermost one of said cutting inserts overlapping slightly with a periphery of said body and said cutting inserts being offset from one another but also overlap one another so that relative to one another said cutting inserts are arranged with a sloped-back phasing forming an overall continuous cutting edge extending from said central axis to said periphery of said body in which each of said inside cutting edge segments of said respective cutting inserts leads the corresponding one of said outside cutting edge segments thereof relative to the forward cutting direction of said drill.

2. The drill of claim 1 wherein said outside cutting edge segment of said cutting edge of each said cutting insert is sloped outwardly and rearwardly from 23° to 25° relative to a plane extending normal to said central axis of said elongated body through said leading end thereof.

3. The drill of claim 1 wherein said body includes:
   a mounting shank extending axially along a rear portion of said body; and
   a pair of diametrically opposed sectors extending along a front portion of said body adjacent to opposite sides of said central axis thereof, said sectors defining flutes therebetween which open at said leading end of said body in a direction pointing away from said shank.

4. The drill of claim 3 wherein each said sector includes:
   a pair of side wall surfaces angularly displaced circumferentially from one another and extending generally radially outwardly from said central axis of said body; and
   an end wall surface extending between and interconnecting said side wall surfaces.

5. The drill of claim 4 wherein said sector also includes at least one axially extending passage defined therethrough and opening at said end wall surface on said leading end of said body.

6. The drill of claim 4 wherein one of said side wall surfaces on each said sector leads the other of said side wall surfaces thereon relative to the direction of rotation of said drill with respect to the workpiece during a cutting operation, said one leading side wall surface having a plurality of pockets defined therein which open to said leading end of said body.

7. The drill of claim 6 wherein each said pocket seats one of said plurality of cutting inserts, said pockets being defined so as to place said cutting inserts at said different radial locations relative to said central axis of said body.

8. The drill of claim 1 wherein each said cutting insert has the shape of a generally equilateral triangle with each side of said triangle formed by said cutting edge having said pair of respective inside and outside active cutting edge segments extending at said obtuse angle relative to one another.

9. The drill of claim 1 wherein said obtuse angle is between 155° and 160°.

10. The drill of claim 1 wherein said inside and outside cutting edge segments of said respective cutting inserts extending at said obtuse angles to one another and defining said apexes are angularly displaced at acute angles from said plane normal said central axis of said body, said acute angles increasing in size from said innermost one insert to said outermost one insert.

11. A drill for producing a hole in a workpiece by relative rotary motion between the drill and workpiece and by movement of the drill relative to the workpiece in a forward cutting direction, said drill comprising:
   (a) an elongated body having a central axis and a leading end, said body having a pair of diametrically opposed sectors extending along a front portion of said body adjacent to opposite sides of said central axis thereof, said sectors defining flutes therebetween which open at said leading end of said body, each said sector having at least one side wall surface extending generally radially outwardly from said central axis of said body, said one side wall surface of each said sector having a plurality of pockets defined therein which open to said leading end of said body; and
   (b) a plurality of cutting inserts mounted on said leading end of said body in said pockets in said side walls surfaces of said sectors, said cutting inserts being displaced at different radial locations relative to said central axis of said body, each said cutting insert having a cutting edge formed by a pair of respective inside and outside active cutting edge segments with said inside cutting edge segment being located closer to said central axis of said body than said outside cutting edge segment thereof, said inside and outside cutting edge segments of said respective cutting inserts extending at obtuse angles to one another and defining therebetween apexes which are axially displaced at different distances from a plane normal to said central axis of said body at said leading end thereof, said different distances increasing in length from an innermost one of the inserts to an outermost one thereof, said innermost one of said cutting insert overlapping slightly with said central axis of said body and said outermost one of said cutting inserts overlapping slightly with a periphery of said body and said cutting inserts being offset from one another but also overlap one another so that relative to one another said cutting inserts are arranged with a sloped-back phasing forming an overall continuous cutting edge extending from said central axis to said periphery of said body in which each of said inside cutting edge segments of said respective cutting inserts leads the corresponding one of said outside cutting edge segments thereof relative to the forward cutting direction of said drill.

12. The drill of claim 11 wherein said outside cutting edge segment of said cutting edge of each said cutting insert is sloped outwardly and rearwardly from 23° to 25° relative to a plane extending normal to said central axis of said elongated body through said leading end thereof.

13. The drill of claim 11 wherein each said cutting insert has the shape of a generally equilateral triangle with each side of said triangle formed by said cutting edge having said pair of respective inside and outside active cutting edge segments extending at said obtuse angle relative to one another.

* * * * *